United States Patent Office 3,368,621
Patented Feb. 13, 1968

3,368,621
OIL RECOVERY WITH MISCIBLE DRIVES IN-
CORPORATING IN SITU MODIFICATION OF
MISCIBILITY
Joseph Reisberg, Houston, Tex., assignor to Shell Oil
Company, New York, N.Y., a corporation of Delaware
No Drawing. Filed Dec. 6, 1965, Ser. No. 511,971
3 Claims. (Cl. 166—9)

This invention relates to a method of recovering petroleum from subterranean reservoirs and, more particularly, it concerns an improved method for displacing petroleum from such reservoirs by the injection of miscible fluids which displace the petroleum from the pore space of the formation. Specifically, it is an improved miscible drive method.

Today, petroleum is often recovered from subterranean reservoirs by the injection of fluids to displace the oil from the formation when the oil will not flow or flows too slowly in response to any natural drive forces existing within the reservoirs. These displacement methods of recovery of oil are part of a large group of techniques or methods often referred to as "secondary recovery techniques."

In these methods or techniques, in which fluids are injected to displace oil from the pore space of the reservoir, the general pattern employed is to penetrate the formation with two or more spaced wells, employing at least one for injecting the fluids into the formation and the remaining wells for recovering effluents displaced from the formation. Normally, a displacing fluid is injected through one of the wells and forced radially out into the formation under sufficient pressure to drive the oil in the formation ahead of the displacing fluid to one or more production wells located a spaced distance from the well through which the fluids are injected.

Factors most controlling in the effectiveness of the displacing fluid in displacing oil from the formation are the degree of miscibility of the displacing fluid with the oil in the reservoir and the relative mobility of the displacing fluid in the reservoir to the relative mobility of the oil in the reservoir. This latter characteristic is often referred to as mobility ratio. The most idealized situation is when the displacing fluid is completely miscible with the oil in the formation and has a mobility ratio approaching unity, since such conditions will give the best areal sweep efficiency.

In these methods, wherein a miscible displacing fluid is used, it is often desirable to inject into the formation only a slug of the displacing fluid and follow it by a cheap, expendable driving fluid which drives the slug, which in turn drives the oil, to the production wells where it can be recovered. This technique of using inexpensive secondary driving fluids is highly important to the economical operation of such miscible drives since most of the miscible displacing fluids are relatively expensive materials, such as propane, butane, pentane, liquid petroleum gas, alcohols, ketones, aldehydes, esters, etc. When cheap, expendable driving fluids are used behind the displacing fluid, the problems become somewhat more complicated. When, if not before, the oil miscible displacing fluid has dissolved oil, it tends to become less mobile, like the oil, and the same miscibility and mobility ratio problems exist at the interface of the miscible displacing fluid and the driving fluid as exist between the interface of the oil in the formation and the displacing fluids. Thus, in a practical situation, the miscible displacing fluid should not only be miscible with the oil in the reservoir but should also be miscible with the driving medium used to drive the slug of displacing fluid through the reservoir. Of course, this means the displacing fluid must be miscible in both the oil and the driving fluid that is used to push it through the reservoir which, more often than not is water. Satisfying all the parameters relative to miscibility and mobility in processes using miscible fluid displacing mediums is an expensive proposition often involving a mixture of several materials to achieve the desired results. For example, see U.S. 3,167,118 issued to Habermann wherein a long chain polymer is added to the miscible fluid displacing medium to adjust the mobility ratio without effecting the miscibility between the displacing fluid and the oil in place and which also discusses the importance of relative mobility in the reservoir and is incorporated herein to that extent.

Probably, one of the most limiting considerations in using miscible displacing fluids is the loss of such fluids in the reservoir and/or in the oil recovered from the reservoir. The oil solutions of the oil miscible displacing fluids are not easily separated and the recovery of the displacing fluid becomes expensive.

Accordingly, it is an object of this invention to provide a secondary recovery method of recovering oil from subterranean reservoirs wherein the miscible displacing fluid is initially soluble in the oil and subsequently soluble in a low cost aqueous drive medium.

It is also an object of the present invention to provide a method of recovering oil from subterranean reservoirs by using miscible displacement wherein a substantial amount of the displacing fluid can be easily recovered.

Another object of this invention is to provide a method of oil recovery using a miscible displacing fluid by which greater quantities of oil can be produced by enhanced areal sweep efficiencies, over waterfloods.

The above objects, and others which will be apparent from the specific description which follows, can be accomplished in a formation penetrated by at least one injection well and at least one production well spaced therefrom by carrying out the steps of: (1) injecting a slug of a liquid, preferentially oil-soluble carboxylic acid which is a precursor of a water-soluble alkali metal salt; (2) then injecting an aqueous driving medium containing sufficient alkali metal hydroxide to convert the injected acid to the water-soluble alkali salt of the acid; and (3) recovering the oil displaced from the formation through the production wells as it is forced thereinto by the injection of said liquid slug and said aqueous driving medium.

The miscible drive method of this invention should not be confused with the in situ generation of surfactants, which is materially different. Surfactant materials have molecules which contain groups which are water-soluble and groups which are oil-soluble. The presence of such groups accounts for their surface-active character and gives them the ability to solubilize, emulsify and/or displace the oil in the pore space in the reservoir. In contrast, the carboxylic acids used in this invention are those which form water-soluble alkali metal salts which are preferentially water-soluble and are not surfactant materials. A comparison of the interfacial tension effects of the carboxylic acids used in the practice of this invention, i.e., the $C_4$ to $C_{10}$ carboxylic acids, and the carboxylic acids that are surface active in the form of their alkali metal salts, with acids that are surface active in the form of such salts can be demonstrated by measurements of the interfacial tensions between kerosene and water solutions containing, e.g., sodium caprylate and sodium oleate. Since the molecular weight of sodium caprylate is about one-half that of sodium oleate, a 0.5% by weight concentration of sodium caprylate water solution, which exhibits a surface tension of 32.5 dynes, corresponds, in molecular concentration of surfactant, to a 1% by weight concentration of sodium oleate in water, which exhibits a surface tension of 0.5 dyne. The surfactant material, sodium oleate, is therefore about 65 times more effective in lowering the surface tension than the sodium caprylate. This demonstrates that the salts of the organic acids used in this invention have insignificant surface activity when compared to the organic acids that are generally classified as surfactants. Further, it is well known that a surfactant that is effective in oil recovery must reduce the interfacial tensions to below at least 1.0 dyne, and this is not the case with the $C_4$ to $C_{10}$ organic acids.

Distinguishing more precisely, this invention involves a miscible displacement of oil from formations by injecting an oil-miscible liquid carboxylic acid which can be converted, via as in situ chemical reaction, into a water-soluble solution of the salt of the acid. The injected acid thus has the characteristics of a substance which is initially miscible in oil and is subsequently miscible in alkaline water and the use of it allows an operator to select a desirable mobility ratio for the individual reservoir. Thus, the invention involves the introduction of an organic acid or mixtures of such acids which, through an in situ chemical reaction, exhibits the characteristics of a mutually oil and water miscible liquid but does not depend upon the formation of a surfactant to emulsify or modify the interfacial tensions to improve displacement of oils from formations.

Organic acids which are suitable for use in the practice of the present invention comprise the normally liquid carboxylic acids that exhibit preferentially oil miscibility and form alkali metal salts that exhibit preferential water-miscibility. This class of organic acids is characterized by a molecular structure such that the salts of the acids show little surface activity and, usually, by the presence of less than 12 carbon atoms per molecule. In general, the $C_4$ to $C_{10}$ aliphatic, alicyclic and aromatic carboxylic acids are preferred. These organic acids may have saturated and/or unsaturated carbon-carbon linkages, but must have the preferential solubilities of acid and alkali metal salt noted above.

Specifically, the $C_4$ to $C_{10}$ aliphatic acids are the more preferred acids for use in the present invention. Among these aliphatic acids it is preferred that a selection be made of an acid which will, at formation temperature, have a viscosity approximating that of the oil in the formation in order to achieve a good mobility ratio. This may be achieved by selection of a specific acid, or several of the acids may be combined to form a liquid having a desired viscosity.

It is not difficult to carry out the method of the invention since the carboxylic acid which is oil-miscible is injected as a slug through the injection well and it is generally desirable that the volume of the slug be about 0.2 to about 0.6 of the pore volume of the formation in which the oil is to be displaced. More acid could be used but this reflects unfavorably on the economy of the novel method. Most often the carboxylic acids which are injected will be in the pure and/or semi-pure form and generally should contain less than about 10% of non-acidic impurities and/or diluents.

After the slug of carboxylic acid has been injected into the reservoir, the next step is to follow it with an aqueous driving medium containing alkali metal hydroxide. In general, the concentration of the alkali metal hydroxide in a driving medium could be sufficient to neutralize all of the acid injected into the reservoir. As the aqueous alkali solution is injected, the previously injected slug of oil-miscible acid is forced radially outward to the formation displacing reservoir oil ahead of it in the direction of the production wells, since the acid slug is oil-miscible and highly effective in displacing the reservoir oil from the formation.

The aqueous alkali is preferably separated from the acid by a spacer slug of an inert liquid (such as water) having a volume sufficient to keep the reactants separated until they have entered the reservoir formation. This avoids a loss of reactants during their passage through the conduits and the borehole. In any event, the frontal portion of the aqueous alkali becomes a water solution of dissolved acid salt, due to the reaction between the acid and the alkali.

Within the reservoir formation, the injected acid effects a miscible displacement of the oil. The portion of water, and/or the spent alkali solution, that is immediately behind the acid, displaces the acid to the extent of a residual "oil phase" where the oil phase is the acid. The aqueous alkali that follows the water (or spent alkali solution) then dissolves the acid and conveys it to the production wells in the form of a salt solution from which the acid can readily be recovered.

The interface of the acid slug and aqueous driving medium can be controlled to some extent by grading the concentration of the alkali metal hydroxide in the aqueous driving medium following the oil-miscible acid slug. Normally, it would be desirable to use somewhat more dilute alkali metal hydroxide concentrations in the frontal portions of the aqueous driving medium so that the interface remains quite broad and does not convert the acid to its water-soluble salt too rapidly. The later portions of the aqueous driving medium may be more concentrated in order to neutralize any of the acid which is bypassed by the leading or forward edge of the aqueous driving medium. Another technique to slow down the conversion of the acid to its water-soluble salt is to inject a small slug of fresh water between the oil-miscible acid slug and the aqueous driving medium containing the alkali metal hydroxide in solution. The effects of the use of the slug of fresh water between the acid slug and the aqueous driving medium containing alkali metal hydroxide acts much in the same way as gradation of the concentration of the alkali metal hydroxide in the aqueous driving medium wherein the frontal portion is more dilute than the later portions of the aqueous driving medium.

Another modification to the practice of this invention is to include viscosity-enhancing agents into the aqueous driving medium containing an alkali metal hydroxide which tends to establish a more desirable mobility ratio between the aqueous driving medium and the oil-miscible acid slug. Any of the well known polymeric materials which are used in other oil recovery processes could be applied in the instant invention and will not be discussed further. When the oil to be recovered is very viscous the polymeric material may be used.

Of course, some savings may be effected by injecting pure water or brine after one or two pore volumes of the aqueous driving medium containing the alkali metal hydroxide has been injected since additional alkali metal hydroxide is of little utility thereafter. This, of course, effects a savings in the costs of alkali metal hydroxides and improves the overall economics of the process.

The recovery of displaced oil from the formation is accomplished through the production well as a result of the injection of the acid slug driving the oil in the formation ahead of it as the aqueous driving medium is injected through the injection well(s). If the conditions in the reservoir were ideal, the first material recovered through the production well will be an oil bank followed by a solution of the alkali metal salt of the acid and thereafter by aqueous driving mediums comprising a low cost water or brine.

Where most or all of the acid has been converted to the water-soluble salt and has become dissolved or dispersed in the aqueous driving medium, it is possible to recover the acid from the driving medium by merely collecting the frontal portion of the driving medium and treating it with a strong mineral acid. This converts the water-soluble alkali metal salts to the carboxylic acid. Since the acid is not soluble to an appreciable extent in the water, the acid will form a separate phase and can be collected for subsequent use according to the practice of this invention.

A series of experiments were carried out to demonstrate the effectiveness of this process. This information is set forth below as an example but is not intended to limit the invention.

*Example I*

In carrying out the experiments, a number of similar sand packs were prepared in water and thereafter each flooded with crude oil to residual water saturation. Subsequently, each of the sand packs was flooded with water to residual oil saturation. Then, each of the sand packs was injected with a slug of undiluted, organic acid in an amount equal to 20% of the packs pore volume with different organic acids. Thereafter, each pack was flooded with an alkaline aqueous solution at a linear rate of 1 foot per day. All the packs were maintained at 70° C. during these tests. For convenience, the information obtained by these experiments is set forth in tabular form in Table 1 below. The table gives the initial residual oil saturation in percent of pore volume both before treatment and after the aqueous alkaline solution had passed through the pack for each of the liquid organic acids tested.

TABLE 1

| Residual Oil Saturation (percent P.V.) | Slug Material | Viscosity (cp., 70° C.) | Concentration of NaOH (percent wt.) | Final Saturation (percent P.V.) |
| --- | --- | --- | --- | --- |
| 25.5 | Oleic Acid | 7.3 | 0.3 | 11.0 |
| 25.0 | Tall Oil Heads [1] | 7.4 | 1.0 | 14.0 |
| 24.5 | Linolenic Acid [2] | 5.3 | 1.0 | 5.5 |
| 22.0 | Caprylic (Octanoic) Acid | 2.0 | 1.0 | 0 |

[1] A low cost tall oil derivative containing about 50 percent fatty acids of primarily unsaturated and polyunsaturated types.
[2] Polyunsaturate 18 carbon atom acid containing 3 double bonds.

TABLE 2.—INTERFACIAL TENSION MEASUREMENT (BETWEEN WATER SOLUTIONS AND KEROSENE)

| Concentration (percent wt.) | Interfacial Tension | | Conditions, Etc. |
| --- | --- | --- | --- |
| | Sodium Caprylate | Sodium Oleate | |
| 0 | (47.9) | (47.9) | Du Nouy Tensiometer, Room Temperature |
| 0.5 | 32.5 | 1.3 | |
| 1.0 | 27.5 | 0.5 | |

The results of measurements shown in Tables 1 and 2 indicate that the process results in substantially total oil recovery when a low carbon number carboxylic acid (caprylic) is utilized. Such an acid forms an alkali metal salt which cannot be considered surface-active, as evidenced by the insignificant decrease in surface tension of water exhibited by the sodium caprylate. With the exception of linolenic acid, all of the other acids that were tested form alkali metal surfactants as exemplified by sodium oleate—yet they do not yield favorable oil recovery results. The reason for this lies in the relatively low water solubility of the alkali metal salts (soaps) of these higher carbon number saturated or substantially saturated carboxylic acids as well as the higher viscosities of the acid form. Intermediate results are obtained with a high carbon number highly unsaturated acid, such as linolenic acid; but it is well known that due to the high degree of unsaturation, the alkali metal salts of such acids are more soluble than those of the less unsaturated acids and that they are also inferior if not inoperative as surfactants. In this respect, the linolenic acid resembles the lower molecular weight caprylic acid more than it does the other acids that were tested.

I claim as my invention:
1. An improved miscible displacement method for displacing oil from reservoirs penetrated by at least one injection well and at least one production well spaced therefrom comprising:
   (a) injecting a slug of liquid, preferentially oil-soluble, carboxylic acid having from 4 to 10 carbon atoms which is a precursor of a solution of a water-soluble alkali metal salt of the acid;
   (b) subsequently injecting an aqueous driving medium containing sufficient alkali metal hydroxide to convert all of said injected liquid acid to its preferentially water-soluble alkali metal organic salt; and,
   (c) recovering oil displaced by the injection of the liquids from the reservoirs via the production well.
2. A method according to claim 1 wherein the slug of the liquid preferentially oil-soluble carboxylic acid is partly recovered by recovering the frontal portion of the aqueous driving medium and treating it with a strong mineral acid to convert the salt into a carboxylic acid which separates from the water phase.
3. A process according to claim 1 wherein the aqueous driving medium containing the alkali metal hydroxide is introduced into the reservoir as a slug and is followed by brine or fresh water.

References Cited

UNITED STATES PATENTS

| 3,174,542 | 3/1965 | Reisberg | 166—9 |
| 3,185,214 | 5/1965 | Bernard et al. | 166—9 |
| 3,111,984 | 11/1965 | Reisberg | 166—9 |
| 3,111,985 | 11/1963 | Reisberg | 166—9 |
| 3,298,436 | 1/1967 | McCardell | 166—9 |

JAMES A. LEPPINK, *Primary Examiner.*